Patented Dec. 26, 1933

1,941,145

UNITED STATES PATENT OFFICE 1,941,145

COOKING UTENSIL

Albert L. Clapp, Danvers, Mass.

No Drawing. Application March 21, 1930
Serial No. 437,946

5 Claims. (Cl. 53—6)

This invention relates to the manufacture of cooking utensils, and more especially to utensils comprising a cellulose fiber foundation or base, impregnated with an agent which renders the base resistant to destruction under cooking temperatures.

Cellulose fiber is a comparatively inexpensive raw material which lends itself well to forming into cooking utensils of various shapes, but, inasmuch as it undergoes considerable decomposition under cooking temperatures, it must be used together with an agent which renders it fire-resistant. It has been proposed to form cooking utensils with a cellulose fiber base and to render them fire-resistant by impregnation with sodium silicate solution and then drying.

I have discovered that there is only a comparatively narrow range of strengths of sodium silicate solution which may be successfully used for the impregnation of the fibrous base of cooking utensils. Thus, I have found that while one might reasonably expect concentrated sodium silicate solutions to impart optimum characteristics to the finished article, such is not the case, for if one uses as the impregnating agent for the utensil a sodium silicate solution much above 20° Baumé, and then thoroughly dries the utensil, not only does he find it difficult to effect a rapid and uniform impregnation, but, more serious than this, the apparently dried-out sodium silicate oozes under cooking temperatures from the interior of the utensil to the surface and blisters it, contaminates the food cooked therein, and causes a sticking of the food to the utensil. On the other hand, if one uses a too dilute solution of sodium silicate, for instance one below 5° Baumé, he finds that insufficient fire resistance is imparted to the utensil even when it is used for the baking of bulky, heat absorbent food, such as pies, which abstract a large part of the heat from the utensil and keep it at comparatively low temperatures. In accordance with the present invention, I employ as the impregnating agent for cooking utensils made with cellulose fiber, a sodium silicate solution of about 5° to 20° Baumé, as I have found that not only does such a solution effect a rapid and substantially uniform impregnation of the utensil, but the resulting utensil possesses the desired fire resistance and at the same time the dried-out sodium silicate present therein does not ooze therefrom under cooking temperatures. The particular strength of sodium silicate solution which I employ in any case depends upon the type of cellulose fiber used as a raw material, the physical characteristics, especially the density of the fiber structure or foundation of the utensil, and the heat-absorbing qualities of the food to be cooked or baked, the use of bulky, highly heat-absorbent food permitting the use of sodium silicate solutions falling into the low strength region of the range of strengths hereinbefore specified. Ordinarily, however, in order to be on the safe side so far as fire resistance and rigidity are concerned, even when the finished articles are to be used as containers in which pies are baked, I prefer to use sodium silicate solutions of from 10° to 20° Baumé. I find it disadvantageous and impractical to use sodium silicate solutions of strengths much above 20° Baumé. For instance, when solutions of 30° Baumé are used to impregnate fibrous foundations of sufficient porosity to permit impregnation therewith, it is found that when the impregnated foundation is dried slowly and carefully for an exceedingly long period of time, the subjection of the dried foundation to cooking or baking temperatures is accompanied by the oozing of silicate therefrom. When solutions of about 40° Baumé, which represents the strength possessed by the sodium silicate of commerce, are used, the foregoing difficulty is accompanied by the further serious trouble that these solutions do not materially penetrate into fibrous foundations of even high porosity. While I am unable to account with precision for the results which I secure, nevertheless it appears that the comparatively dilute sodium silicate solutions which I employ dry out to form a solid residue quite different from that produced when concentrated sodium silicate solutions are employed. In the latter case, it is believed that the dried-out sodium silicate contains a large amount of what may be termed water of hydration, whereas in the former case the dried-out sodium silicate is associated with little such water. When sodium silicate sets with a large amount of water of hydration, heating causes a melting or fusing of sodium silicate in the water of hydration to produce a solution which oozes to the surface of the utensil where the liberation of the water from the solution as steam causes blistering. When a dilute sodium silicate solution is dried out, there is evidently insufficient water of hydration therein to produce oozing under the application of heat to the surface of the utensil. This lack of oozing may be traceable to the fact that there is more hydrolysis in a dilute sodium silicate solution to form siliceous acid, which when dried is dehydrated completely to form silica, which serves as a fire-resisting agent. Whether or not this explanation is correct, it is a fact that sodium silicate solutions of a strength of about 5° to 20° Baumé may be used to produce fire-resistant cooking utensils from which the sodium silicate does not ooze under cooking temperatures.

The impregnating treatment hereinbefore described may be effected upon cooking utensils of various descriptions, but it is particularly applicable to plates or pans the base of which is composed practically entirely of cellulosic material and designed for use as containers in which pies are to be baked. In such case, baking is performed at temperatures of about 250° to 600° F., but pies absorb so much heat from the containers throughout the baking operation that the containers are able to withstand temperatures under which they alone might undergo destruction. For instance, whereas a plate or pan the base of which consists practically only of cellulosic material even after being impregnated with sodium silicate solutions such as hereinbefore described and then dried, might undergo destruction when heated by itself to temperatures of 250° to 600° F., when used as containers in which pies are baked, they maintain their form and retain sufficient strength so that they may be handled together with their contents without danger of disintegration after the baking operation.

I shall now give examples of procedures falling within the purview of the present invention and concerned more particularly with the production of plates or pans for baking pies, but it is to be understood that other cooking utensils may be similarly made. The treatment with sodium silicate solution may be performed on plates which have been formed or moulded from an aqueous fiber suspension or from paper or sheeted pulp. Preferably, the plates are in unsized or lightly sized condition, and comprise substantially unbeaten fibers, as such plates permit uniform and rapid impregnation with the sodium silicate solution. The plates are dipped in a sodium silicate solution of about 5° to 20° Baumé until they have been thoroughly impregnated, whereupon they are permitted to drain free of excess solution and are then dried until little, if any, moisture is present therein. They are then preferably pressed in dies, or moulds, which impart a hard, smooth finish thereto. The finished plates thus produced are much stiffer than the untreated plates. In lieu of treating formed plates with sodium silicate solution, the cellulose fiber may be formed into a sheet on papermaking machinery, impregnated in sheet form with sodium silicate solution, and then formed or moulded into plates. In such case, the fiber is preferably sheeted in an unbeaten condition so as to produce a product of maximum absorptivity. The sheet may be impregnated by passing through a sodium silicate solution of about 5° to 20° Baumé, whereupon the impregnated sheet may be squeezed free of excess solution, and then dried to compacted low water content, say about 15%, at which content it may be readily moulded without tending to disintegrate, preferably under heat, into plate form. If desired, the sheet in suitable condition for moulding may be cut into blanks, but it is possible to mould and at the same time to sever the moulded plates completely from the sheet. The moulded plates, if not completely dried during the moulding operation, are then brought to a bone-dry condition.

I have found it desirable to use a highly absorbent material along with cellulose fiber in the stock or furnish used for producing the base or foundation to be impregnated. While various absorbent materials, such as cellite, may be employed, I prefer to use sawdust or wood flour, as these latter materials are available as waste products and are thus relatively cheap and they do not discolor the finished article. A "furnish" or stock of this type may comprise, say, 30 parts of sawdust of about 14 to 20 mesh, and 70 parts of cellulosic pulp, these ingredients being mixed together with water in the beater engine, but preferably with little or no hydration or gelatinization of the cellulose fibers. After a physically homogeneous mixture or aqueous suspension has been produced, the mixture may be moulded into plates or formed into sheet material on a paper machine. When such sheet material is dipped into a 20° Baumé solution for, say, about four to five seconds, and then squeezed free from excess solution, it is sufficiently absorbent so that when dried it contains about 10% to 15% sodium silicate, which imparts the characteristics desired. If desired, mica flakes may be used in lieu of or in addition to the highly absorbent material, as mica serves to separate the fibers in the resulting sheet and thus to increase its porosity and at the same time serves to increase its fire resistance. The use of a highly absorbent material such as sawdust and/or mica may be extended to cases where a portion of the cellulose fiber is replaced by asbestos fiber, although I do not claim herein broadly the treatment of an asbestos-cellulose fiber foundation with sodium silicate solution, followed by moulding into articles such as cooking utensils, as this is described and claimed in my application Serial No. 94,329, filed March 12, 1926. When asbestos fiber, which is fire-resistant, is employed as herein described, I am permitted to use sodium silicate solutions falling into the low strength region of the range of strengths hereinbefore specified. In such case, the sodium silicate alone is not relied upon to impart the desired fire-resistance to the article and hence may be of comparatively low strength. Cooking utensils such as hereinbefore described may be of a thickness of, say, 10 to 15 points, at which thickness they are quite stiff and rigid as a result of impregnation with sodium silicate and then drying. They are greaseproof and sufficiently water-resistant to withstand the baking of foods such as pies therein, but they may be rendered waterproof by coating them with dispersed or molten paraffin. After cooking, they are quite waterproof, as cooking temperatures decompose the sodium silicate to precipitate silica in the pores of the utensil, which hinders the passage of water therethrough.

Various cellulose fibers or mixtures of fibers, including kraft, sulphite, soda, and groundwood pulp, may be used as raw material for the fibrous foundation. As already stated, the fiber is preferably used in a free or unbeaten condition and in unsized or only lightly sized condition, as such stock yields a fibrous structure which may be readily and uniformly penetrated by a sodium silicate solution of the strengths hereinbefore given. In my application hereinbefore referred to, the reaction of sodium silicate with one or more constituents present in the fibrous structure was relied upon to produce a product having the desired characteristics, but, according to my present invention, the sodium silicate is not caused to react with another material in the fibrous structure, but is dried out as such in the sheet, to produce a finished article having eminently satisfactory characteristics.

I claim:

1. A cooking utensil comprising a cellulosic fibrous structure carrying as an impregnant substantially uniformly therethroughout a dried-out solution of sodium silicate of about 5° to 20° Baumé.

2. A cooking utensil, the base of which comprises cellulose fiber and an absorbent material, said base carrying as an impregnant a dried-out solution of sodium silicate of about 5° to 20° Baumé.

3. A cooking utensil, the base of which comprises cellulose fiber, asbestos fiber, and an absorbent material, said base carrying as an impregnant a dried-out sodium silicate of about 5° to 20° Baumé.

4. A cooking utensil, the base of which comprises cellulose fiber and mica, said base carrying as an impregnant a dried-out solution of sodium silicate of about 5° to 20° Baumé.

5. A cooking utensil, the base of which comprises cellulose fiber and sawdust, said base carrying as an impregnant substantially uniformly therethroughout a dried-out solution of sodium silicate of about 5° to 20° Baumé.

ALBERT L. CLAPP.